United States Patent Office 3,513,704
Patented May 26, 1970

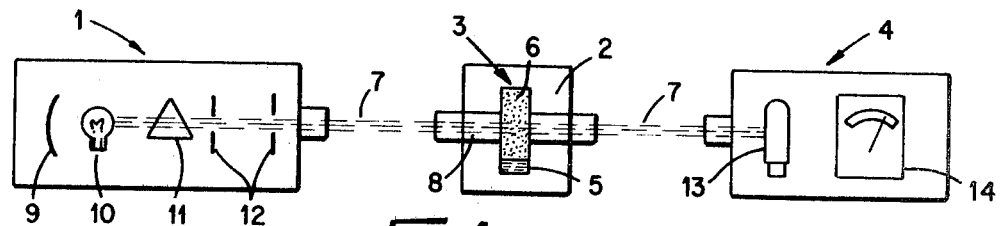
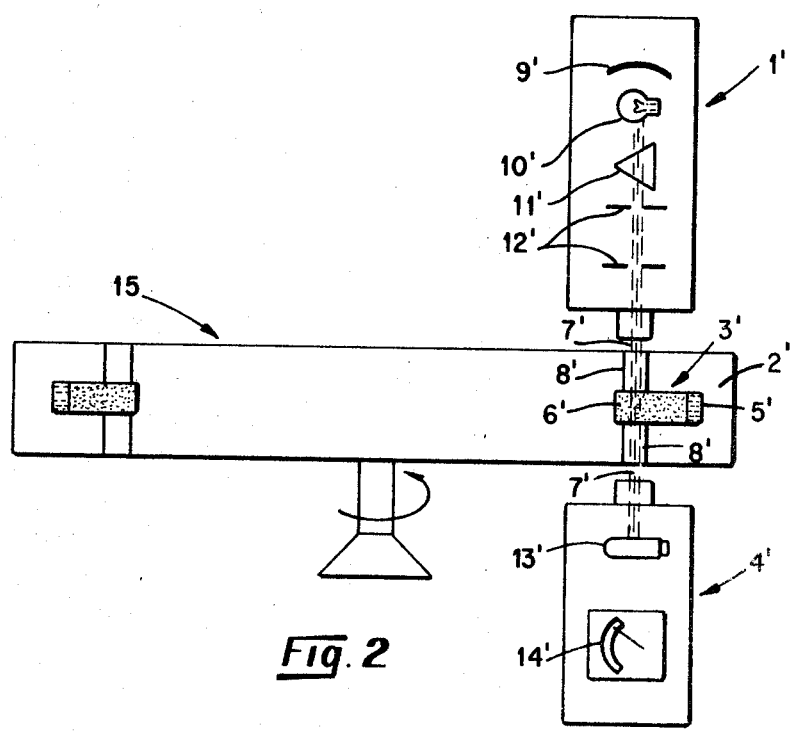
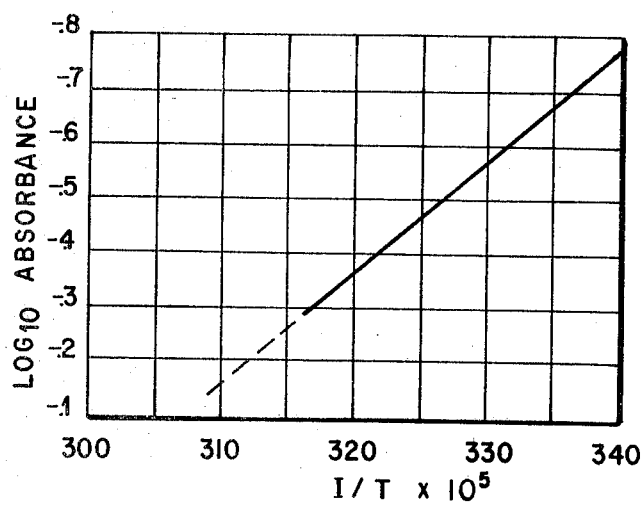

---

3,513,704
PHOTOMETRIC THERMOMETER AND METHOD OF OPERATION
Donald W. Hatcher, Clinton, Tenn., assignor to the United States of America as represented by the United States Atomic Energy Commission
Filed May 26, 1969, Ser. No. 827,843
Int. Cl. G01j *5/58;* G01k *13/04*
U.S. Cl. 73—339                                  6 Claims

ABSTRACT OF THE DISCLOSURE

A photometric therometer and method of temperature measurement in which the absorbance of the vapor phase of a volatile liquid in a sealed transparent container is correlated with temperature. The sealed container is placed in an object whose temperature is to be measured. A photometric system is then used to measure the absorbance of the vapor phase within the sealed container and that value correlated with temperature for a particular liquid and wavelength.

BACKGROUND OF THE INVENTION

The invention described herein relates generally to temperature measuring devices and more specifically to a photometric thermometer and its method of operation. It was made in the course of, or under, a contract with the U.S. Atomic Energy Commission.

Conventional temperature measuring apparatus and methods rely upon the expansion of a solid, liquid or gas, electrical conductivity, or the thermoelectric effect. In addition, certain optical devices such as optical pyrometers may be used where high temperatures are being measured. Pyrometric cones are also used in certain high temperature measurements such as those encountered in the ceramic industries.

Although each of the above approaches to temperature measurement has certain advantages and disadvantages, none is ideally suited to measuring temperatures under dynamic conditions such as encountered in the rotary cuvette systems described in copending U.S. applications of common assignee S.N. 784,739, S.N. 806,920 and S.N. 827,185. In dynamic photometric analysis as described in those applications, the temperatures of interest are too low for the use of optical pyrometers or pyrometric cones. The stroboscopy requirement for the expansion methods is an expensive complication with the expansion materials subject to centrifugal forces, and the maintenance of electrical contacts in the electrical conductivity and thermoelectric methods is difficult and adds significant expense to the cuvette system.

It is, accordingly, a general object of the invention to provide a method of measuring temperature under dynamic conditions.

Another object of the invention is to provide a method of measuring temperatures in a moving body without requiring electrical contact with that body.

Other objects of the invention will be apparent from an examination of the following description of the invention and the appended drawings.

SUMMARY OF THE INVENTION

In accordance with the invention, a photometric thermometer is provided within both static and dynamic temperature measurements may be made without electrical contact being required between the temperature readout means and the object whose temperature is being measured. A sealed transparent container partially filled with volatile liquid is placed in the object or medium whose temperature is measured. The absorbance of the vapor phase in the container is measured at a preselected wavelength and correlated with the temperature of the liquid in the container to determine the object's temperature. Such method of temperature measurement is particularly suited to dynamic temperature measurements in the rotary cuvette systems described in the aforesaid patent applications since photometric systems are already provided therein for sample analysis.

BRIEF DESCRIPTION OF THE DRAWINGS

FIG. 1 schematically illustrates the operation of a photometric thermometer in a static system.

FIG. 2 schematically illustrates the operation of a photometric thermometer in a cuvette rotor.

FIG. 3 is a plot of the log of absorbance versus the reciprocal of absolute temperature (1/T) obtained from the experiment described in the example.

DETAILED DESCRIPTION OF THE INVENTION

FIG. 1 schematically illustrates the operation of a photometric thermometer in a static system. The system comprises a light source 1, a heat transfer medium 2 which may simply comprise the structural material of the object whose temperature is being measured, a sealed container 3 in intimate contact with the heat transfer medium, and a photometric detecting unit 4. Sealed container 3 contains a volatile liquid 5 and vapor 6. In principle. a narrow beam of light 7, illustrated by a series of broken lines on the drawing, is projected through the vapor-containing portion of an upstanding container and is received by a photosensitive detector after passing through the container. The intensity of the light beam reaching the re-receiver is diminished by absorbance in the vapor. Liquid 5, which is retained at the bottom of container 3 by gravity, is preselected to have a substantial vapor pressure and substantial light absorbing properties. The liquid is also preselected with a suitable variation in vapor pressure within the temperature range in which it is to be used. Thus, increases in temperature cause an increase in vapor pressure with a corresponding increase in absorbance.

Light source 1 comprises a reflector 9, an incandescent lamp 10, prismatic means 11 or filters for providing light of desired wavelength, and aperture plates 12 to collimate the light into a narrow beam.

Photometric detecting unit 4, comprising a photomultiplier tube 13 and a readout scale 14, is aligned to receive light transmitted through container 3 and vapor 6. Detecting unit 4 is designed to respond electronically with an output proportional to the intensity of light beam 7 after it has passed through container 3. Its output may be correlated with the temperature of liquid 5 and heat transfer medium 2 in a manner to be described below.

Referring now to FIG. 2, a photometric thermometer is schematically illustrated as used to measure the temperature of a moving cuvette rotor 15. Reference numerals 1' through 14' are used in FIG. 2 to denote components which are similar to or identical with components denoted by reference numerals 1 through 14 in the earlier reference to FIG. 1. The main distinguishing feature between the photometric thermometer described in the two figures is that the sealed container 3' in FIG. 2 is fixed in a moving cuvette rotor whereas the sealed container 3 shown in FIG. 1 is located in a static object. As shown, centrifugal force causes volatile liquid 5' to be retained in the radially outermost extremity of container 3' during rotation.

Cuvette rotors are described in detail in copending U.S. patent applications of common assignee S.N. 784,739, S.N. 806,920 and S.N. 827,185. In the cuvette rotors described in those applications, a series of sample-holding cuvettes are disposed in a pancake-shaped rotor which is rotated at high speed through a light beam used for photometric analysis of the samples in the cuvettes. A light source photodetecting unit and associated electronic components are briefly described in copending U.S. patent applications S.N. 784,739 and S.N. 827,185. A system for simultaneously displaying the absorbance of a multiplicity of sample-containing cuvettes on an oscilloscope is described in copending U.S. patent application S.N. 784,719 of common assignee. Since rotary cuvette systems of the type described in the aforementioned applications are designed to operate with photometric measuring systems, applicant's photometric thermometer can be readily used therein by simply mounting sealed container 3' within an existing cuvette cavity and sharing the existing photometric measuring system. With such an arrangement the absorbance of the vapor phase in container 3' can be displayed on the same oscilloscope with the other cuvette readings. Although a single thermometer is considered adequate to monitor rotor temperature, additional thermometers could be used by simply adding additional sealed containers 3' to the rotor.

In practice, sealed glass vials of any convenient size may be used as sealed containers 3 and 3'. Small sizes are most advantageous, however, since they have a lower total heat capacity and thus can more closely follow temperature deviations in the object or medium whose temperature is being measured. Although in theory any volatile liquid may be used in the sealed containers, those liquids which have substantial vapor pressures and substantial light absorbing properties at the temperatures of interest are most desirable. High vapor pressures and absorptivity assure the most accurate temperature readings since significant changes in absorbance of the vapor phase will accompany temperature changes in such liquids.

Applicant has found that bromide, benzene, toluene and nitrogen dioxide work very well as the volatile liquid. These liquids have been found to have suitable vapor pressures and absorptivity at the temperatures of interest and suitable wavelengths for use in the rotary cuvette systems referred to above.

After sealing each glass ampule or container containing a volatile liquid, an individual calibration curve of temperature versus absorbance at the desired wavelength is run for that ampule. The calibration curve is later used to provide a simple means of directly correlating absorbance readings with temperature for a particular ampule. With individual calibration curves for each ampule, dimensional changes and the inclusion of gas and liquid contaminants in the ampule will not render it inaccurate. The preparation of a sample ampule and its temperature-absorbance calibration may be further understood by way of the following example.

EXAMPLE

Ampules were made from 4 cm. length of glass tubing having a 1.10 cm. internal diameter and selected for convenience in fitting in an available cuvette rotor. The ampules were closed at one end and affixed at the other end with 5 cm. necks of capillary tubing. About 0.3 ml. of liquid bromine was added to each ampule. A liquid nitrogen bath was used to freeze the bromine during subsequent evacuation and flame sealing of the ampule by closing the capillary neck. One ampule was simply evacuated and sealed as a reference vessel. A second reference vessel, containing 2 ml. of phenol red dye solution having an absorbance of 1.45 in a 1.1 cm. path length using a wavelength of 480 nanometers (nm.), was sealed similarly.

A calibration of absorbance against temperature was obtained in a static system using a jacketed chamber to hold the ampule upright in a light beam having a wavelength of 480 nanometers which was used to measure absorbance. Water from a thermostatically controlled bath was pumped through the walls of the chamber at 2 liters per minute. Absorbance of the vapor in the ampule at various temperatures was measured with care taken to avoid bromine condensation on the ampule walls.

The static calibration was verified on a spinning rotor encased in a thermostatically-controlled chamber. A bromine-containing ampule was fastened to the top of a stainless steel, six-inch diameter rotor directly over a one-fourth-inch hole drilled through the rotor. Similarly, the dye-containing reference ampule was also fastened to the rotor. Light from a light source mounted below the rotor passed through the two samples to a photomultiplier tube. The output of the photomultiplier tube was monitored with an oscilloscope and recorded with a camera. The light transmission data recorded at various chamber temperatures was used to plot the graph of FIG. 3 which shows an expected linear relationship between the $\log_{10}$ of absorbance versus $1/T$ where $T$ is absolute temperature. The data obtained and plotted in FIG. 3 conforms to the behavior of real gases as defined by the well known Clausius-Clapeyron equation. Absorbance changed by 0.062 O.D. units per degree centigrade at a 1.1 cm. path length and a 480-nanometer wavelength. The rate of rotation did not affect the absorbance of the gaseous phase during dynamic testing.

The above description of the invention is offered for illustrative purposes only and should not be interpreted in a limiting sense. For example, the method described is not limited to measuring temperatures in rotary cuvette systems although it is very suitable for use in such systems. Containers of almost any shape may be used and volatile liquids other than those mentioned may be found suitable. It is intended, rather, that the invention be limited only by the appended claims.

What is claimed is:

1. A method for determining temperature comprising:
   (a) partially filling a sealed transparent container with a volatile liquid so that at least part of said container is filled with vapor of said liquid, the absorbance of said vapor being temperature-dependent;
   (b) placing said container in heat exchange relationship with the medium whose temperature is to be determined;
   (c) allowing said liquid in said container to reach thermal equilibrium with said medium;
   (d) photometrically measuring the absorbance of said vapor; and
   (e) correlating said measured value of absorbance with the temperature of said liquid and medium.

2. The method of claim 1 wherein said volatile liquid is selected from one of the group consisting of bromine, benzene, toluene and nitrogen dioxide.

3. A system for photometrically measuring the temperature of a medium comprising:
   (a) a sealed container partially filled with a volatile liquid so that at least part of said container is filled with a vapor of said liquid, the absorbance of said vapor being temperature-dependent; and
   (b) means for photometrically determining the absorbance of said vapor in said container;

said absorbance of said vapor being correlated with the temperature of said liquid and with said medium under thermal equilibrium conditions.

4. The system of claim 3 wherein said volatile liquid is selected from the group consisting of bromine, benzene, toluene and nitrogen dioxide.

5. The system of claim 3 wherein said sealed container is made of glass.

6. The system of claim 3 wherein said means for photometrically determining the absorbance of said vapor in said container comprises a light source which projects a beam of light of selected wavelength through said vapor and a detector for measuring the intensity of said beam of light after it has passed through said vapor.

References Cited

UNITED STATES PATENTS 2,792,484   5/1957   Gurewitsch et al. --- 73—355 XR
2,844,033   7/1958   Tandler et al. --------- 73—355
2,871,758   2/1959   Moutet ---------- 73—355 XR LOUIS R. PRINCE, Primary Examiner F. SHOON, Assistant Examiner U.S. Cl. X.R.

73—355; 356—43, 180